United States Patent
Cook et al.

(10) Patent No.: US 9,061,905 B2
(45) Date of Patent: Jun. 23, 2015

(54) FERROELECTRIC GLASS NANOPARTICLES, LIQUID-CRYSTAL COMPOSITIONS, AND ELECTRONIC DEVICES CONTAINING THE NANOPARTICLES

(71) Applicant: Azimuth Corporation, Dayton, OH (US)

(72) Inventors: Gary Cook, Beavercreek, OH (US); Dean R. Evans, Beavercreek, OH (US); Sergey A. Basun, Beavercreek, OH (US)

(73) Assignee: Azimuth Corporation, Dayton, OH (US)

( * ) Notice: Subject to any disclaimer, the term of this patent is extended or adjusted under 35 U.S.C. 154(b) by 107 days.

(21) Appl. No.: 13/712,433

(22) Filed: Dec. 12, 2012

(65) Prior Publication Data

US 2013/0329179 A1 Dec. 12, 2013

Related U.S. Application Data

(60) Provisional application No. 61/657,136, filed on Jun. 8, 2012.

(51) Int. Cl.

| | |
|---|---|
| *B02C 17/00* | (2006.01) |
| *B02C 17/20* | (2006.01) |
| *C09K 19/52* | (2006.01) |
| *C09K 19/54* | (2006.01) |
| *B82Y 30/00* | (2011.01) |
| *B03C 5/00* | (2006.01) |
| *B02C 23/08* | (2006.01) |
| *C09K 19/02* | (2006.01) |
| *G02F 1/1333* | (2006.01) |

(52) U.S. Cl.
CPC ............... *B82Y 30/00* (2013.01); *C09K 19/54* (2013.01); *G02F 1/1333* (2013.01); *B03C 5/00* (2013.01); *B02C 17/00* (2013.01); *B02C 23/08* (2013.01); *Y10S 977/00* (2013.01); *C09K 19/0225* (2013.01); *C09K 2019/521* (2013.01); *B02C 17/20* (2013.01)

(58) Field of Classification Search
CPC .......... C09K 19/0225; C09K 19/0521; C09K 19/54; C09K 2019/521; B82Y 20/00; B82Y 30/00; B82Y 40/00; B02C 17/00; B02C 23/08
USPC ................. 252/299.01, 299.5; 349/172, 182; 501/11, 40, 41, 53
See application file for complete search history.

(56) References Cited

U.S. PATENT DOCUMENTS

| | | | |
|---|---|---|---|
| 5,342,648 A | 8/1994 | MacKenzie et al. | |
| 8,018,648 B1 | 9/2011 | Cook et al. | |
| 8,308,977 B2 * | 11/2012 | Zhang et al. | 252/299.01 |
| 2011/0089382 A1 * | 4/2011 | Zhang et al. | 252/570 |
| 2013/0183711 A1 * | 7/2013 | Sjong | 435/34 |

OTHER PUBLICATIONS

G. Cook, A.V. Glushchenko, V. Yu. Reshetnyak, E.R. Beckel, M.A. Saleh, D.R. Evans; Liquid Crystal Inorganic Hybrid Photorefractives; pp. 129-130; IEEE Xplore; Conference Publications; Conference Jan. 14-16, 2008.
G. Cook, A.V. Glushchenko, V. Reshetnyak, A.T. Griffith, M.A. Saleh, D.R. Evans; Nanoparticle Doped Organic-Inorganic Hybrid Photorefractives; Optics Express 4015; Mar. 17, 2008; vol. 16, No. 6.
H Atkuri, G Cook, D R Evans, C-I Cheon, A Glushchenko, V. Reshetnyak, Yu Reznikov, J West, K Zhang; Preparation of Ferroelectric Nanoparticles for their use in Liquid Crystalline Colloids; Journal of Optics A: Pure and Applied Optics 11 (Jan. 14, 2009) (5pp).
G. Cook, V. Yu. Reshetnyak, R.F. Ziolo, S.A. Basun, P.P. Banerjee, D.R. Evans; Asymmetric Freedericksz Transitions from Symmetric Liquid Crystal Cells Doped with Harvested Ferroelectric Nanoparticles; Optics Express 17339; Aug. 2, 2010; vol. 18, No. 16.
G. Cook; J.L. Barnes, S.A. Basun, D.R. Evans, R.F. Ziolo, A. Ponce, V. Yu. Reshetnyak, A. Glushchenko, P.P. Banerjee; Harvesting Single Ferroelectric Domain Stressed Nanoparticles for Optical and Ferroelectric Applications; Journal of Applied Physics 108, 064309 (Sep. 2010).

* cited by examiner

*Primary Examiner* — Shean C Wu
(74) *Attorney, Agent, or Firm* — Dinsmore & Shohl LLP

(57) ABSTRACT

Methods for preparing ferroelectric nanoparticles, liquid crystal compositions containing the ferroelectric nanoparticles, and electronic devices utilizing the ferroelectric nanoparticles are described. The methods of preparing the ferroelectric nanoparticles may include size-reducing a starting material comprising particles of a bulk intrinsically nonferroelectric glass to form glass nanoparticles having an average size of less than 20 nm, the glass nanoparticles comprising ferroelectric nanoparticles. Exemplary bulk intrinsically non-ferroelectric glasses may include borosilicate glasses, tellurite glasses, bismuthate glasses, gallate glasses, and mixtures thereof, for example. The size reduction may be accomplished using ball milling with a solvent combination such as n-heptane and oleic acid. Liquid crystal compositions may include the ferroelectric nanoparticles in combination with a liquid crystal. Exemplary electronic devices include liquid crystal displays, in which a liquid crystal composition containing the ferroelectric nanoparticles is disposed adjacent a window material.

25 Claims, No Drawings

FERROELECTRIC GLASS NANOPARTICLES, LIQUID-CRYSTAL COMPOSITIONS, AND ELECTRONIC DEVICES CONTAINING THE NANOPARTICLES

CROSS-REFERENCES TO RELATED APPLICATIONS

The present application claims the benefit of priority under 35 U.S.C. §119(e) to U.S. Provisional Application Ser. No. 61/657,136, filed Jun. 8, 2012, incorporated herein by reference in its entirety.

TECHNICAL FIELD

The present specification relates generally to ferroelectric materials and devices containing ferroelectric materials and, more specifically, to nanoparticles of ferroelectric materials made from bulk non-ferroelectric glasses and liquid-crystal compositions containing the same.

BACKGROUND

Nanoparticles fabricated from ferroic materials have attracted much scientific interest, drawing contributions from the nanomaterial, ferroelectric, optical, liquid crystal, metamaterial, and photorefractive communities. The simple addition of low concentrations of ferroic nanoparticles to a variety of media can have startling and unexpected benefits. For example, optical studies of liquid crystal colloids doped with ferroic nanoparticles have become a topical subject in which the additions of ferroelectric and ferromagnetic nanoparticles have variously been reported to moderate the phase transition temperatures, to influence the dielectric anisotropy, to affect the electric field induced liquid crystal reorientation Freedericksz transition, and to increase optical diffraction or beam coupling efficiencies. In particular, liquid crystals appear to benefit significantly through the addition of very small quantities of nanoparticles made from ferroelectric source materials. For example, the use of single ferroelectric domain nanoparticles in liquid crystals has been shown to have a profound effect on the electrical Freedericksz transition threshold, as well as increasing the optical two-beam coupling gain in hybrid photorefractive devices. The premise for adding ferroelectric nanoparticles to liquid crystals is that the permanent spontaneous polarization of these materials may lead to an increase in the overall liquid crystal sensitivity to externally applied electric fields.

The influence of ferroelectric nanoparticles on their environment depends intimately on the net strength of the particle dipole moment arising from the ferroelectric domain spontaneous polarizations. The net dipole moment for any given ferroelectric nanoparticle is maximized when the structure becomes single domain. Unfortunately, common production methods such as chemical precipitation and spark plasma production cannot ensure that the resulting nanoparticles have strong ferroelectric dipole moments or that the material is even ferroelectric for smaller size particles, due to the size dependence of the ferroelectric effect.

In general, ferroelectricity is a property of certain materials to have a spontaneous electric polarization that can be reversed by application of an external electric field. When most materials are polarized by an applied electric field, the induced polarization is almost exactly proportional to the applied electric field, a linear polarization. Ferroelectric materials, however, exhibit a nonlinear polarization and also exhibit a nonzero spontaneous polarization even when the applied electric field is zero. This spontaneous polarization can be reversed by an applied electric field. The polarization is dependent not only on the current electric field but also on its history, yielding a hysteresis loop. Thus, the ferroelectric properties of a material may be evaluated from both the characteristic hysteresis loop and the existence and magnitude of a permanent electric dipole moment.

A number of materials are intrinsically ferroelectric. Common examples of intrinsically ferroelectric materials include barium titanate ($BaTiO_3$), lead titantate ($PbTiO_3$), and lead zirconium titanate (($Pb,Zr)TiO_3$). Owing to their ferroelectric properties, these materials have already found uses in electronic devices including liquid crystal devices. Nevertheless, the intrinsically ferroelectric materials have very specific compositions and optical properties that inherently may limit the full range of applications in which they may be used. For example, in liquid crystal media requiring some degree of refractive index matching among the components of the liquid crystal media, it may not be possible to acquire both the desired ferroelectric effect and the refractive index match from a narrow list of intrinsically ferroelectric materials.

Thus, there remain ongoing needs for versatile ferroelectric materials that may be used in applications such as liquid-crystal media.

SUMMARY

In some embodiments, methods for preparing ferroelectric nanoparticles are described. The methods may include size-reducing a starting material comprising particles of a bulk intrinsically nonferroelectric glass to form glass nanoparticles having an average size of less than 20 nm, the glass nanoparticles comprising ferroelectric nanoparticles. Exemplary bulk intrinsically nonferroelectric glasses may include borosilicate glasses, tellurite glasses, bismuthate glasses, gallate glasses, and mixtures thereof, for example.

In some embodiments, liquid crystal compositions are described. The liquid crystal compositions may include a liquid crystal and ferroelectric nanoparticles. The ferroelectric nanoparticles are prepared by physically size-reducing at least one bulk intrinsically nonferroelectric glass to an average particle size of less than 20 nm.

In some embodiments, electronic devices are described. The electronic devices include a first window and a liquid crystal composition disposed adjacent the first window. The liquid crystal compositions may include a liquid crystal and ferroelectric nanoparticles. The ferroelectric nanoparticles are prepared by physically size-reducing at least one bulk intrinsically nonferroelectric glass to an average particle size of less than 20 nm.

Additional features and advantages of the embodiments described herein will be set forth in the detailed description which follows, and in part will be readily apparent to those skilled in the art from that description or recognized by practicing the embodiments described herein, including the detailed description and appended claims.

It is to be understood that both the foregoing general description and the following detailed description describe various embodiments and are intended to provide an overview or framework for understanding the nature and character of the claimed subject matter.

DETAILED DESCRIPTION

Methods for preparing ferroelectric nanoparticles will now be described. Liquid crystal compositions containing the ferroelectric nanoparticles, and electronic devices containing the liquid crystal compositions, will be described below.

The term "ferroelectric" is used herein to describe materials that exhibit a polarization-electric field (P-E) hysteresis loop that is commonly understood to be characteristic of ferroelectricity, according to its accepted definition. The term "intrinsically ferroelectric" is used to describe materials that are ferroelectric in at least their bulk form. Conversely, the term "intrinsically nonferroelectric" is used to describe materials that are not ferroelectric in their bulk form. As used herein, the term "bulk form" refers to a macroscopic form of the material, whether crystalline, amorphous, or otherwise, in which discrete particles or units of the material have sizes greater than 1 μm, though typically many orders of magnitude larger.

In some embodiments, methods for preparing ferroelectric nanoparticles may include size-reducing a starting material containing particles of a bulk intrinsically nonferroelectric glass. The size reducing may be continued until glass nanoparticles are formed that have an average size of less than 100 nm, less than 50 nm, preferably less than 20 nm, more preferably less than 10 nm, or from 0.1 nm to 100 nm, from 0.1 nm to 50 nm, preferably from 0.1 nm to 20 nm, more preferably from 0.1 nm to 10 nm, for example. The glass nanoparticles may comprise ferroelectric nanoparticles, may consist of ferroelectric nanoparticles, or may consist of a mixture of ferroelectric nanoparticles and nonferroelectric nanoparticles. The shapes of the glass nanoparticles may be spherical, cylindrical, cubic, spherulitic, elongated, jagged, or plate-like, for example.

The starting material contains particles of a bulk intrinsically nonferroelectric glass. In some embodiments, the bulk intrinsically nonferroelectric glass may be a mixed-oxide glass or a non-oxide glass such as a sulfide glass. In illustrative embodiments, the bulk intrinsically nonferroelectric glass may be selected from the group consisting of borosilicate glasses, tellurite glasses, bismuthate glasses, gallate glasses, sulfide glasses, and mixtures thereof. In such embodiments, the bulk intrinsically nonferroelectric glass may be described as being formed from at least two components including a first component and at least one second component.

In illustrative embodiments, the first component may be selected from the group consisting of $TeO_2$ (for telluride glasses), $Bi_2O_3$ (for bismuthate glasses), $SiO_2$ (for borosilicate glasses), $Ga_2O_3$ (for gallate glasses), and $M_xS_y$ (for sulfide glasses). For the sulfide glasses, M is a metal with an oxidation state V of from 1 to 6, and V=2y/x. In illustrative embodiments, M may be selected from the group consisting of Ga, La, As, Si, Ge, B, Al, Sb, and Cd. One non-limiting specific example of a first component for a sulfide glass is $Ga_2S_3$.

In illustrative embodiments, the at least one second component may be selected from the group consisting of $Li_2O$, $Na_2O$, $K_2O$, $Bi_2O_3$, $Ga_2O_3$, PbO, $WO_3$, $LiNbO_3$, $Nb_2O_5$, $TiO_2$, ZnO, BaO, $SiO_2$, $Al_2O_3$, $B_2O_3$, $La_2O_3$, and $La_2S_3$, and mixtures thereof, where the at least one second component is different from the first component. In some embodiments, the bulk intrinsically nonferroelectric glass may be formed from the first component and exactly one second component. In other embodiments, the bulk intrinsically nonferroelectric glass may be formed from the first component and more than one second component, such as two, three, four, or five of the second components.

In some embodiments, the bulk intrinsically nonferroelectric glass is a tellurite glass. Examples of tellurite glasses include, without limitation, lithium sodium tellurite glasses, lead tellurite glasses, tungsten tellurite glasses, lithium potassium tellurite glasses, lithium potassium tellurite glasses, lithium lithium niobate tellurite glasses, lithium niobium tellurite glasses, lithium titanium tellurite glasses, and lithium tungsten tellurite glasses.

In some embodiments, the bulk intrinsically nonferroelectric glass is a bismuthate glass. Exemplary bismuthate glasses include, without limitation, lithium bismuthate glasses, lithium zinc bismuthate glasses, lithium titanium bismuthate glasses, lithium titanium zinc bismuthate glasses, silicon bismuthate glasses, titanium bismuthate glasses, and lithium barium bismuthate glasses.

In some embodiments, the bulk intrinsically nonferroelectric glass is a gallate glass. Exemplary gallate glasses include, without limitation, bismuth lead gallate glasses, bismuth lead silicon gallate glasses, bismuth tungsten gallate glasses, bismuth titanium gallate glasses, bismuth sodium gallate glasses, and bismuth lithium gallate glasses.

In some embodiments, the bulk intrinsically nonferroelectric glass is a borosilicate glass. Borosilicate glasses generally are formed from $SiO_2$, $B_2O_3$, and at least one additional oxide from the above list of second components. One exemplary borosilicate glass is Pyrex®, which comprises about 80.6 wt. % $SiO_2$, 12.6 wt. % $B_2O_3$, 4.2 wt. % $Na_2O$, 2.2 wt. % $Al_2O_3$, 0.04 wt. % $Fe_2O_3$, 0.1 wt. % CaO, 0.05 wt. % MgO, and 0.1 wt. % Cl.

In some embodiments, the bulk intrinsically nonferroelectric glass is a borosilicate glass. Exemplary sulfide glasses include, without limitation, gallium lanthanum sulfide glasses. Sulfide glasses may include both sulfides and oxides. A non-limiting example of such a sulfide glass contains $Ga_2S_3$ as the first component and $La_2O_3$ as the at least one second component.

The ratio of the first component to the at least one second component in the bulk intrinsically nonferroelectric glass may be varied, based on the ability of specific combinations of the components to form stable glasses. Additionally, it is believed that the ability to vary the ratio of the various components within a range of stability may advantageously allow tailoring of properties such as index of refraction when the ferroelectric nanoparticles are used as additives in a liquid crystal medium, for example. Non-limiting exemplary compositions of the bulk intrinsically nonferroelectric glass are provided in TABLE 1.

TABLE 1

| Ref. | First Component Formula | mol. % | Second Component #1 Formula | mol. % | Second Component #2 Formula | mol. % | Second Component #3 Formula | mol. % |
|---|---|---|---|---|---|---|---|---|
| I-1 | $TeO_2$ | 55-90 | $LiNbO_3$ | 10-45 | — | — | — | — |
| I-2 | $TeO_2$ | 80 | $Li_2O$ | 10 | $Na_2O$ | 10 | — | — |
| I-3 | $TeO_2$ | 75-85 | PbO | 15-25 | — | — | — | — |
| I-4 | $TeO_2$ | 70-80 | $WO_3$ | 20-30 | — | — | — | — |
| I-5 | $TeO_2$ | 80 | $Li_2O$ | 10 | $K_2O$ | 10 | — | — |
| I-6 | $TeO_2$ | 80 | $Li_2O$ | 10 | $LiNbO_3$ | 10 | — | — |
| I-7 | $TeO_2$ | 80 | $Li_2O$ | 10 | $Nb_2O_5$ | 10 | — | — |
| I-8 | $TeO_2$ | 75-85 | $Li_2O$ | 5-10 | $TiO_2$ | 10-15 | — | — |
| I-9 | $TeO_2$ | 36 | $Li_2O$ | 33 | $WO_3$ | 31 | — | — |
| II-1 | $Bi_2O_3$ | 60-80 | $Li_2O$ | 20-40 | — | — | — | — |
| II-2 | $Bi_2O_3$ | 50-70 | $Li_2O$ | 10-30 | ZnO | 1-40 | — | — |
| II-3 | $Bi_2O_3$ | 47 | $Li_2O$ | 38 | $TiO_2$ | 15 | — | — |
| II-4 | $Bi_2O_3$ | 47 | $Li_2O$ | 30 | ZnO | 8 | $TiO_2$ | 15 |
| II-5 | $Bi_2O_3$ | 23-54 | $SiO_2$ | 46-77 | — | — | — | — |
| II-6 | $Bi_2O_3$ | 28-61 | $TiO_2$ | 39-72 | — | — | — | — |
| II-7 | $Bi_2O_3$ | 4-9 | $Li_2O$ | 64-87 | BaO | 4-32 | — | — |
| III-1 | $Bi_2O_3$ | 30-50 | $Ga_2O_3$ | 25 | PbO | 25-45 | — | — |
| III-2 | $Bi_2O_3$ | 20-25 | $Ga_2O_3$ | 14-18 | PbO | 48-56 | $SiO_2$ | 1-18 |

TABLE 1-continued

| | First Component | | Second Component #1 | | Second Component #2 | | Second Component #3 | |
|---|---|---|---|---|---|---|---|---|
| Ref. | Formula | mol. % | Formula | mol. % | Formula | mol. % | Formula | mol. % |
| III-3 | Bi$_2$O$_3$ | 25 | Ga$_2$O$_3$ | 17.9 | WO$_3$ | 57.1 | — | — |
| III-4 | Bi$_2$O$_3$ | 25 | Ga$_2$O$_3$ | 17.9 | TiO$_2$ | 57.1 | — | — |
| III-5 | Bi$_2$O$_3$ | 66.7 | Ga$_2$O$_3$ | 23.8 | NaO$_2$ | 9.5 | — | — |
| III-6 | Bi$_2$O$_3$ | 31.4 | Ga$_2$O$_3$ | 11.4 | Li$_2$O | 57.1 | — | — |
| IV-1 | Ga$_2$S$_3$ | 55-70 | La$_2$S$_3$ | 30-45 | — | | — | |

The bulk intrinsically nonferroelectric glasses may be formed by any suitable method for forming glasses from mixed components. In some embodiments, the methods for preparing ferroelectric nanoparticles may include preparing the particles of the bulk intrinsically nonferroelectric glass used as the starting material. For example, powders of the first component and the at least one second component may be intimately mixed and placed in a suitable melting vessel such as a ceramic crucible. The crucible then may be heated above the melting point of the components, generally to a temperature of from about 800° C. to 1200° C., depending on the components, to form a molten mixture. The molten mixture may be poured from the crucible onto a cool surface, such as a glass plate at room temperature, for example, to quench the mixture and form a vitrified solid. Optionally, the vitrified solid may be annealed at a temperature of from about 400° C. to about 700° C., for example. To prepare the vitrified solid for size reduction to nanoparticles, it may be preferable to crush the vitrified solid to form particles having sizes of from about 1 μm to about 100 μm, preferably from about 1 μm to about 10 μm or from about 1 μm to about 5 μm. It should be understood that when physical size reduction techniques such as ball milling are used, the initial particle size is not critical, but preferably should be smaller than the grinding ball size. In general, during ball milling, the particle size decreases exponentially with grinding time and reaches a small value of a few microns after only a few minutes of milling. Thereafter, further milling provides finer particles, but at a slower rate.

In the methods for preparing ferroelectric nanoparticles, a starting material containing particles of the bulk intrinsically nonferroelectric glass described above is size-reduced to form nanoparticles. Without intent to be bound by theory, it is believed that size reduction of a bulk glass may impart ferroelectric characteristics into particles having sizes of less than 100 nm, less than 50 nm, or less than 20 nm, depending on the material, owing in part to the physical energy that is transferred to the glass material during the size reduction. In this regard, it is believed that the ferroelectric characteristics of the glass nanoparticles formed by the size reduction methods described herein would not be attainable in the same materials, were the materials to be formed by other common methods for forming nanoparticles such as, for example, chemical sedimentation, sol-gel, flame photolysis, chemical precipitation, or spark plasma production. In particular, it is believed that these "non-stressful" preparation methods can allow nanoparticles to undergo phase changes, whereby they may become paraelectric and lack a permanent dipole or polarization. Paraelectric materials can be polarized under an applied electric field, but unlike ferroelectric materials, the paraelectric materials lose their polarization when the applied electric field is removed, rendering them unsuitable for applications in ferroelectric devices such as electronic devices or liquid crystal displays. It is believed that the ferroelectric nanoparticles formed according to embodiments described herein may contain only a single ferroelectric domain, or sufficiently few ferroelectric domains, such that they can retain a permanent polarization after application of an external electric field.

According to some embodiments, the particles of the bulk intrinsically nonferroelectric glass are a component of a starting material, and the particles are size reduced in the presence of other components of the starting material. For example, the starting material may be a slurry formed by adding a grinding fluid to the particles of the bulk intrinsically nonferroelectric glass. The grinding fluid may comprise a solvent, preferably a non-polar solvent. The grinding fluid may further comprise a compound having both polar and non-polar moieties such as a surfactant. In one exemplary embodiment, the grinding fluid may contain a mixture n-heptane as a non-polar solvent and oleic acid as a surfactant. It is believed that including a surfactant in the starting material may prevent agglomeration of the bulk intrinsically nonferroelectric glass during size reduction. It is also believed that the molecules of the surfactant may attach their polar group to the surfaces of the glass particles, while the motion of the non-polar groups builds up a repulsive force between the particles. The ratio of grinding fluid to glass particles in the starting material may vary. In one exemplary embodiment, the starting material may comprise n-heptane, oleic acid, and glass particles mixed at a weight ratio of about 1:1:20. The starting material may be subjected to sonication in an ultrasound bath for several seconds to ensure complete dispersion of the particles in the grinding fluid.

In some embodiments, the size reducing may be accomplished by wet ball milling in a suitable apparatus such as a planetary ball mill, with which the starting material is added into a grinding jar and grinding balls are added to the starting material in the grinding jar. Various types of high-energy milling equipment are available to produce microparticles and nanoparticles. The types of equipment differ in their capacity, milling efficiency, and ability to control temperature, for example. Planetary ball mills owe their name to the planet-like movement of grinding jars about a central axis. The grinding jars may be arranged on a rotating support disc, and a drive mechanism may cause the grinding jars to rotate around their own respective axes. The grinding jar rotates about its own axis and, in the opposite direction, around a common axis of the rotating support disc below the grinding jar. The superimposition of centrifugal forces established by this arrangement produces grinding ball movements with a high pulverization energy. The centrifugal forces acting on the grinding jar wall initially carries the grinding balls in the direction in which the grinding jar is rotating. Differences occur between the speed of the grinding jar wall and the balls; this results in strong frictional forces acting on the sample. As the rotational movement increases, Coriolis forces act on the balls to displace them from the grinding jar walls. The balls fly through the grinding jar interior and impact against the sample on the opposite grinding jar wall. This releases considerable dynamic impact energy. Process parameters that may be optimized include, for example, milling container; milling speed; milling time; type, size and size distribution of the grinding medium; ball-to-particle weight ratio; extent of filling the grinding jar; process control agent; and temperature of milling. All these process variables are not completely independent. For example, the optimum milling time may depend on the type of mill, size of the grinding medium, temperature of milling, or ball-to-powder ratio.

The grinding jars preferably have a hardness significantly greater than the hardness of the glass particles being size reduced. In some embodiments, zirconia or yttria-stabilized zirconia grinding jars may be used. It is believed that the use of hard materials as the grinding jars avoids dislodgement of the grinding jar material during the size reduction and, thereby, prevents contamination of the nanoparticles being formed.

Any suitable grinding speed may be used, depending on the milling equipment being used. In some planetary ball mills, the maximum speed limitation is based on the speed at which the grinding balls will be pinned to the inner walls of the mixing jar and thus cannot fall down to exert impact force on the glass particles. Therefore, the maximum grinding speed should be just below this value so that the grinding balls fall down from the maximum height to produce the maximum collision energy. It should be understood that at high speeds (or intensity) of milling, the temperature of the grinding jars may reach a high value. Thus, the suitable speed may be further limited with certain glass materials that may decompose at elevated temperature. In illustrative embodiments, the size reducing by ball milling may be conducted with a grinding speed of from about 60 rpm to about 1000 rpm, such as about 500 rpm, for example. In illustrative embodiments, the grinding temperature may be maintained from about 20° C. to about 100° C., or from about 20° C. to about 50° C.

The size reduction may occur over any time interval sufficient to reduce the size of the glass particles to less than 100 nm, less than 50 nm, less than 20 nm, or less than 10 nm, as desired. The time of milling determines the final size of the ferroelectric nanoparticles. The times required to reach a certain nanoparticle size vary depending on the material being size-reduced, the intensity of milling, the ball-to-powder ratio, and the temperature of milling. In some embodiments, the size reduction occurs for a time period just long enough to ensure the desired nanoparticle size is attained, but not overly long to ensure undesirable phases form. In illustrative embodiments, a grinding time of from about 30 minutes to about 60 hours may be used, preferably from about 10 hours to about 40 hours, more preferably from about 15 hours to about 30 hours.

In some embodiments, the methods for preparing the ferroelectric nanoparticles may further include harvesting the ferroelectric nanoparticles from the glass nanoparticles. Though the size-reduction process according to the embodiments described above produces ferroelectric nanoparticles without additional steps, the harvesting process may effectively enrich the ferroelectric characteristics of the glass nanoparticles by selecting the nanoparticles exhibiting the strongest polarizability, particularly those nanoparticles consisting essentially of a single ferroelectric domain.

The harvesting process may include transferring the glass nanoparticles into a harvesting vessel, the harvesting vessel comprising at least one catch plate. Then, a nonuniform electric field gradient may be created within the harvesting vessel. The nonuniform electric field gradient propels the ferroelectric nanoparticles toward the at least one catch plate, from which they may be collected. The nanoparticles that are either nonferroelectric or that have multiple ferroelectric domains and, therefore, a lower polarizability, are not attracted to the catch plate.

Free charges in nonconductive fluid media can be physically separated through the application of an electric field, either uniform or gradient in nature. Without intent to be bound by theory, that the harvesting process is believed to operate on the principle that dipoles experience a translational force only when exposed to a field gradient, in which case the net translational force vector, F, is given by $F=p \cdot E$ where p is the net average dipole moment of the nanoparticle and E is the electric field. Thus, for a given electric field and particle size, the translational force is maximized when average dipole moment is also maximized, occurring when the nanoparticle has a single ferroelectric domain. It is further believed that harvesting with high electric field gradients may ensure that the majority of collected nanoparticles have a single ferroelectric domain and therefore have the largest possible dipole moment.

For a given linear field gradient, assuming a single ferroelectric domain, the net translational force on a dipole scales proportionally with the particle characteristic size. Smaller nanoparticles may require a larger field gradient to generate the same equivalent force that can be obtained from a lower potential with larger particles. Brownian motion effects become progressively more pronounced at smaller particle sizes, and so the required field strength for successful separation scales nonlinearly as the particle size is reduced.

According to some embodiments, the glass nanoparticles may be transferred into a harvesting vessel. In one illustrative embodiment, the glass nanoparticles may be transferred as an aerosol, a "gas-phase" harvesting. In another illustrative embodiment, the glass nanoparticles may be transferred by dispersing them in a dielectric solvent such as n-heptane, for example, a "liquid-phase" harvesting. In both the gas-phase harvesting and the liquid-phase harvesting, a nonuniform electric field gradient is created within the harvesting vessel. The gas-phase harvesting will now be described in greater detail, and the liquid-phase harvesting will be described below.

In some embodiments, the harvesting may be conducted via a gas-phase harvesting. The harvesting vessel in a gas-phase harvesting apparatus may include an insulated tower made from a material such as an acrylic polymer. In one embodiment, the insulated tower may be a hollow vessel of any practical cross-sectional shape. In one embodiment, the insulated tower may have a square cross-section with opposing parallel internal walls. Inside the insulated tower, a plurality of thin metal strips such as razor blades may be arranged as an array on one side of the tower, such as on one of the internal walls in a rectangular tower, with their thinnest side facing the inside of the tower. On the side of the tower opposite the thin metal strips, a sheet of metal may be applied, separated from the thin metal strips by a sufficient distance to prevent electric discharge. In one embodiment, the sheet of metal may be an aluminum plate.

During the harvesting process, the sheet of metal is grounded, and the plurality of thin metal strips are raised to a high direct-current electric potential such as from 20 kV to 5 MV. The high electric potential may be achieved using a van de Graaf generator or other suitable apparatus, for example. When the thin strips of metal are raised to their harvesting potential, a strong electric field gradient is created in the harvesting vessel. A balance between corona emission from the thin metal strips and the grounded sheet of metal may maintain the applied potential at just below the dielectric breakdown threshold for the air gap between the razor blades and the grounded plate.

The glass nanoparticles prepared as described above by size reducing of a bulk intrinsically nonferroelectric glass may be transferred into the harvesting vessel as an aerosol dispersion in air or other dielectric and inert gas. In some embodiments, it may be advantageous to dry and/or deagglomerate the glass nanoparticles before transferring them into the harvesting vessel. The glass nanoparticles may be dried or deagglomerated by introducing them into a concentric gas turbine having blades that circulate the glass nanoparticles in a closed toroidal path within the housing of the turbine. When the turbine is driven at a speed such as 60,000 rpm, for example, the high speed airflow within the gas turbine separates the agglomerated nanoparticles into monoparticulates through a combination of impact with the turbine blades and the housing walls. A small aperture may be provided in the base of the gas turbine to allows the glass nanoparticles to gradually escape into the harvesting vessel and create a quasistatic low concentration aerosol air suspension of monoparticulates.

After the nonuniform electric field is created in the harvesting vessel by charging the thin metal strips to a high potential relative to the grounded metal sheet, and the glass nanoparticles are transferred into the harvesting vessel, the external electric field collects the glass nanoparticles having the largest dipole moments at the surfaces of the thin metal strips. The remaining nanoparticles may be repelled by the field and may collect on the grounded metal plate. In some embodiments, the ferroelectric nanoparticles may be collected from the thin metal strips within 5 seconds to 1 minute after the glass nanoparticles have been transferred and the nonuniform electric field has been created. It is believed that the gas phase harvesting process may be particularly amenable to large-scale operation (on the order of several grams of ferroelectric particles per operation), owing to its rapidity.

In some embodiments, the harvesting may be conducted via liquid-phase harvesting. Whereas the gas-phase harvesting described above may require careful drying of the glass nanoparticles, liquid-phase harvesting does not require drying. In a liquid-phase harvesting process, the glass nanoparticles may be transferred to a harvesting vessel as a suspension or dispersion in a dielectric solvent (preferably nonionic and nonconductive) such as n-heptane, for example. In some embodiments, to avoid flocculation when an electric field gradient is created, the suspension or dispersion may contain a small amount of glass nanoparticles such as from about 0.05 wt. % to about 0.2 wt. %, preferably about 0.08 wt. %, based on the total weight of the suspension or dispersion. The harvesting vessel may be any dielectric material inert to the dielectric solvent such as a glass or polymer. In some embodiments, a transparent glass vial or cylinder may be advantageous, because the harvesting process can be observed through the walls of the harvesting vessel.

In addition to the harvesting vessel, the liquid-phase harvesting apparatus may include a narrow gauge wire axial electrode and an external radial foil electrode that are placed in the suspension or dispersion of glass nanoparticles. The inner wire electrode may be supported within a thin-walled sealed glass capillary tube, for example. Thereby, both the inner and outer electrodes are separated by glass from the suspension or dispersion to prevent any possibility of direct charge injection into the suspension or dispersion and to avert any electrolysis. A plurality of catch plates, such as insulating disks made from a dielectric material such as polytetrafluoroethylene, for example, may be attached to and supported by the inner glass capillary tube. The catch plates catch the harvested nanoparticles as they fall from the inner electrode glass surface when the field is removed. A physical separation between the inner wire electrode and the outer foil electrode may be chosen to any suitable distance that prevents electric discharge during the harvesting process. For example, the separation between the inner wire electrode and the outer foil electrode may be approximately 10 mm when the harvesting vessel is a 5 mL cylindrical glass vial.

In some embodiments, to create a nonuniform electric field in the liquid-phase harvesting apparatus described above, a high direct-current potential of any polarity, such as from about +10 kV to +20 kV or from about −10 kV to about −20 kV, for example, may be applied to the inner wire electrode while the outer foil electrode is grounded. It is believed that potentials of lower absolute magnitude than 10 kV (regardless of polarity) do not generally result in harvesting, and that potentials of absolute magnitude greater than 20 kV (regardless of polarity) may cause aggressive fluid motion within the harvesting apparatus, leading to continuous remixing of harvested and rejected nanoparticles. Nevertheless, it is contemplated that successful harvesting may occur outside the ranges of from about +10 kV to +20 kV or from about −10 kV to about −20 kV.

When the nonuniform electric field is created in the liquid-phase harvesting vessel, the harvested ferroelectric nanoparticles accumulate on the inner wire electrode after the field has been applied for a sufficient time, such as from 30 minutes to 60 minutes, for example, and any nanoparticles without dipole moments or induced charge from the applied field are either rejected and accumulate on the outer glass wall or remain in suspension within the solvent. Once the electric potential is removed from the electrodes, the harvested nanoparticles may settle onto the catch plates and may be collected.

Without intent to be bound by theory, it is believed that glass nanoparticles fabricated by methods other than the size-reducing process according to embodiments described above such as direct chemical synthesis, for example, are not amenable to harvesting. It has been observed, for example, that chemically synthesizes nanoparticles are universally repelled from the high potential electrodes in both the gas-phase and the liquid-phase harvesting systems. It is believed that the inability to harvest the chemically prepared glass nanoparticles may indicate that chemically prepared glass nanoparticles do not exist as dipoles.

Methods for preparing ferroelectric nanoparticles from bulk intrinsically nonferroelectric glasses have been described above. Liquid crystal compositions containing the ferroelectric nanoparticles will now be described. In some embodiments, liquid crystal compositions may contain a liquid crystal and ferroelectric nanoparticles prepared by physically size-reducing at least one bulk intrinsically nonferroelectric glass to an average particle size of less than 20 nm or less than 10 nm, for example. The at least one bulk intrinsically nonferroelectric glass may be selected from materials described above in embodiments for preparing ferroelectric nanoparticles.

The ferroelectric nanoparticles may be produced by any size-reducing method that results in a useful fraction of ferroelectric nanoparticles from the bulk intrinsically nonferroelectric glass. In preferred embodiments, however, the size reduction of the bulk intrinsically nonferroelectric glass is accomplished according to at least one embodiment described herein of methods for preparing ferroelectric nanoparticles. It should be understood from the foregoing description that the preparation method of the glass nanoparticles contained in the liquid crystal compositions has strong implications on the properties of the ferroelectric nanoparticles and that a chemically equivalent liquid crystal composition may not be expected to exhibit identical properties, particularly with regard to ferroelectricity and/or polarizability.

In some embodiments, the liquid crystal may be any liquid crystalline material suitable for use in an electronic device. For example, the liquid crystal may be a cholesteric liquid crystal, a nematic liquid crystal, a smectic liquid crystal, a discotic liquid crystal, a liquid crystal ferroelectric, a ferroic liquid crystal, a columnar liquid crystal, a lyotropic liquid crystal, an oligomeric liquid crystal, an azo-liquid crystal, or mixtures of any of these. Non-limiting specific examples of suitable liquid crystals according to some embodiments include BL038 liquid crystal, E7 liquid crystal, TL205 liquid crystal, and 5CB liquid crystal, available from suppliers such as Merck.

To prepare the liquid crystal compositions, ferroelectric nanoparticles prepared by size-reducing a bulk intrinsically nonferroelectric glass as described above to an average particle size of less than 20 nm and optionally harvesting may be added to a volatile solvent such as n-heptane, for example, to form a colloidal solution. The colloidal solution may be mixed with the liquid crystal, and the volatile solvent may be completely evaporated from the resulting mixture by heating, for example. In an illustrative embodiment, the solvent may be removed by heating to a temperature sufficient to evaporate the solvent from the mixture but below the clearing point of the liquid crystal in the liquid crystal composition. In some embodiments, the liquid crystal composition may contain from about 0.001 wt. % to about 5 wt. %, from about 0.05 wt. % to about 3 wt. %, from about 0.01 wt. % to about 2 wt. %, or from about 0.05 wt. % to about 1.5 wt. %, or from about 0.01 wt. % to about 1 wt. % ferroelectric nanoparticles, based on the combined weight of the ferroelectric nanoparticles and the liquid crystal.

It is believed that the addition of the ferroelectric nanoparticles derived from the bulk intrinsically nonferroelectric glass may increase the liquid crystal phase transition temperature relative to the liquid crystal alone, and also may influence the order parameter of the liquid crystal. Through influence of the order parameter of the liquid crystal, also the birefringence, the viscosity, the elastic constants, and the dielectric anisotropy may be tailored. Moreover, because the precise composition of the bulk intrinsically nonferroelectric glass may be varied, depending on ranges of ingredients capable of producing a bulk glass, it is believed that optical properties of a liquid crystal composition such as index of refraction may be tailored. Thus, it is believed that the doping of liquid crystals with the ferroelectric nanoparticles derived from the bulk intrinsically nonferroelectric glass may be a 'nonsynthetic method' to create new liquid crystals by modifying the properties of existent liquid crystals. It is also believed that the mentioned changes in physical properties of liquid crystals may improve the performance of liquid-crystal-based electronic devices such as liquid crystal displays and light modulators, making such electronic devices operate faster and at lower driving voltages. For example, it has been observed that addition of ferroelectric nanoparticles to cholesteric liquid crystals used in mixtures in bistable cholesteric displays increases the both the brightness and contrast of the display.

Methods for preparing ferroelectric nanoparticles and liquid crystal compositions containing the ferroelectric nanoparticles have been described. Electronic devices containing the ferroelectric nanoparticles and/or the liquid crystal compositions now will be described. In some embodiments, the electronic device may be an optoelectronic device containing the liquid crystal composition. In other embodiments, the electronic device may be a ferroelectric device containing the ferroelectric nanoparticles.

According to exemplary embodiments, an electronic device may be an optoelectronic device and may include a first window and a liquid crystal composition disposed adjacent the first window. The liquid crystal composition may include a liquid crystal and ferroelectric nanoparticles. The ferroelectric nanoparticles may be prepared from at least one bulk intrinsically nonferroelectric glass physically size-reduced to an average particle size of less than 20 nm. Liquid crystal compositions suitable for the optoelectronic devices include those according to the embodiments described above. Likewise, the ferroelectric nanoparticles suitable for the liquid crystal compositions of the optoelectronic devices include those prepared according to the embodiments described above.

In some embodiments, the first window may be any known photorefractive material and/or any material that forms a space-charge field from charge migration arising from either diffusion and/or drift in the form of bulk or epitaxial thin film materials. Exemplary materials according to such embodiments include, without limitation, cerium-doped strontium barium niobate (Ce:SBN), photonic crystals, doped or undoped semiconductors, doped or undoped $Sn_2P_2S_6$ (SPS), doped $BaTiO_3$, doped $KNbO_3$, or any other space-charge field forming material known in the art. In other embodiments, the first window may be any window material known in the art for application as a screen material for a liquid crystal display. The liquid crystal composition containing the ferroelectric nanoparticles is disposed adjacent to the first window. In some embodiments, one or more functional coating layers or electroactive materials may be interposed between the liquid crystal composition and the first window. In other embodiments, the liquid crystal composition may directly contact the first window.

In some embodiments, the optoelectronic device may include a second window, and the liquid crystal composition may be disposed between the first window and the second window. In other embodiments, the optoelectronic device may include electrodes, a power supply, or any electronic circuitry required to cause electronic changes in the liquid crystal composition. In some embodiments, the optoelectronic device may be configured as a liquid crystal display or light modulator. In some embodiments, the optoelectronic device may be configured as a hybrid photorefractive device, similar to those described in U.S. Pat. No. 8,018,648, which is incorporated herein by reference.

In other embodiments, the electronic device may be a ferroelectric device, in which the ferroelectric nanoparticles formed from a bulk intrinsically nonferroelectric material, as described above, are used as an active ferroelectric material in the ferroelectric device. The ferroelectric device may or may not include a liquid crystal composition. Examples of ferroelectric devices may include, without limitation, ferroelectric field-effect transistors, ferroelectric RAM, ferroelectric capacitors, ferroelectric tunnel junctions, and microwave devices.

Thus, ferroelectric nanoparticles, liquid crystal compositions containing the ferroelectric nanoparticles, and electronic devices containing the ferroelectric nanoparticles and/or the liquid crystal compositions have been described. The ferroelectric nanoparticles are derived from a bulk intrinsically nonferroelectric glass that is physically size reduced to particle sizes of less than 20 nm, or at least to the size at which the ferroelectric nanoparticles may consist essentially of a single ferroelectric domain. The ferroelectric nanoparticles formed according to the embodiments described herein are believed to provide numerous applications in electronic and optoelectronic devices, particularly in the field of liquid crystal displays.

EXAMPLES

The following examples are offered by way of illustration. One skilled in the art should recognize that the following examples are not meant to be limiting.

Some Examples herein refer to a nematic liquid crystal mixture TL205. The TL205 is available from Merck GmbH and has a composition as follows (all wt. % being based on the weight of the composition):

15.7 wt. % 1-[4-(4-ethyl-2-fluoro-phenyl)-phenyl]-2-(4-chloro-phenyl)-ethane;
8.1 wt. % 1-[4-(4-propyl-2-fluoro-phenyl)-phenyl]-2-(4-chloro-phenyl)-ethane;
21.2 wt. % 1-[4-(4-pentyl-2-fluoro-phenyl)-phenyl]-2-(4-chloro-phenyl)-ethane;
12.5 wt. % 4-[4-(4-propylphenyl)-3-fluoro-phenyl]-3-fluoro-1-chlorobenzene;
13.8 wt. % 4-[4-(4-pentylphenyl)-3-fluoro-phenyl]-3-fluoro-1-chlorobenzene;
8.7 wt. % 4-[4-(4-propylphenyl)-3-fluoro-phenyl]-3-fluoro-1-fluorobenzene;
10.0 wt. % 4-(trans-4-propyl-cyclohexyl)-3,4'-difluorobiphenyl; and
10.0 wt. % 4-(trans-4-pentyl-cyclohexyl)-3,4'-difluorobiphenyl.

The TL205 exhibits the following properties:
$\Delta\in$ (1 kHz, 20° C.): 5.01;
$\in_\parallel$ (1 kHz, 20° C.): 9.11;
$\Delta n$ (589 nm, 20° C.): 0.217;
$n_o$ (589 nm, 20° C.): 1.527;
S—N: −6° C.;
clearing point: +92° C.; and
viscosity (20° C.): 45 cSt.

It should be understood that the TL205 liquid crystal medium is used as only a single illustration of a suitable liquid crystal to be combined with the ferroelectric nanoparticles formed from intrinsically nonferroelectric bulk glasses and that, as described above, many other types of liquid crystals may be substituted in the place of TL205 in the following Examples.

Example 1

A lead tellurite bulk glass was prepared by intimately mixing $TeO_2$ and PbO powders in an alumina crucible to form a mixture consisting of 25 wt. % PbO and 75 wt. % $TeO_2$ (19 mol. % PbO and 81 mol. % $TeO_2$) The mixture was melted at 800° C. and was quenched by pouring the melt onto a glass surface. The resulting lead tellurite bulk glass was wet-ground with n-heptane using an alumina mortar and pestle to form particles ranging from approximately 1 μm to 1 mm in size. The particles and the n-heptane were placed in a milling jar of a PM200 planetary ball mill (Retsch GmbH) loaded with yttria-stabilized zirconia beads, and oleic acid was added. The particles were ground in the ball mill for approximately 25 hours, resulting in raw nanoparticles having an average size of about 6.88 nm. A sample of the raw nanoparticles were used to prepare a liquid crystal composition containing TL205 doped with 0.08 wt. % raw nanoparticles. The composition exhibited a polarization of $15 \times 10^{-6}$ C/cm$^2$ and no measurable dipole moment.

The raw nanoparticles then were placed into a harvesting vessel, and the harvesting vessel was filled with n-heptane. The harvesting vessel contained a radial ground electrode surrounding a dielectric field tube, through which a voltage source electrode was inserted. Dielectric catch plates made of a dielectric material were attached to the outside of the dielectric field tube at three locations along the dielectric field tube. A potential of −20 kV was applied to the voltage source electrode to establish a nonuniform electric field gradient in the harvesting vessel. All of the lead tellurite glass nanoparticles were ferroelectric and were propelled toward the dielectric catch plates and rapidly formed a thin layer on the dielectric catch plates.

Samples of the ferroelectric nanoparticles harvested at negative applied potential were used to prepare liquid crystal compositions with TL205. A first composition was 0.04 wt. % ferroelectric nanoparticle in the TL205, and a second composition was 0.06 wt. % ferroelectric nanoparticle in the TL205. The 0.04 wt. % composition had a polarization of $0.7 \times 10^{-6}$ C/cm$^2$ and a dipole moment of $7.2 \times 10^{-23}$ C·cm. The 0.06 wt. % composition had a polarization of $1.7 \times 10^{-6}$ C/cm$^2$ and a dipole moment of $4.9 \times 10^{-23}$ C·cm.

In an additional trial, the harvesting was conducted using a positive electric potential of +20 kV. The positive potential resulted in slow collection of only about 60 wt. % ferroelectric nanoparticles, the other 40 wt. % failing to be propelled toward the dielectric catch plate. The ferroelectric lead tellurite nanoparticles were collected for further hysteresis measurements.

A sample of the ferroelectric nanoparticles harvested at positive applied potential was used to prepare a liquid crystal composition with TL205. The composition contained 0.04 wt. % ferroelectric nanoparticle in the TL205. The composition had a polarization of $1.1 \times 10^{-6}$ C/cm$^2$ and a dipole moment of $8.1 \times 10^{-23}$ C·cm. An additional measurement was made on a 0.04 wt. % composition in TL205 of the nanoparticles that failed to be harvested using the positive potential. These rejected particles had a polarization of $20 \times 10^{-6}$ C/cm$^2$ and no measurable dipole moment.

Additional samples of the ferroelectric lead tellurite nanoparticles were mixed in various proportions with TL205 to form liquid crystal compositions. Dielectric hysteresis curves and Freedericksz transition characteristics at 594 nm of the liquid crystal compositions were measured to ascertain Freedericksz asymmetry of the liquid crystal compositions as a function of nanoparticle concentration. The results are compiled in TABLE 2.

TABLE 2

| $TeO_2$/PbO Nanoparticle Concentration (wt. %) | Freedericksz Asymmetry (V) |
|---|---|
| 0 | 0.05 |
| 0.0156 | 0.41 |
| 0.0313 | 0.56 |
| 0.0625 | 1.22 |
| 0.125 | 1.63 |
| 0.250 | 1.76 |
| 0.500 | 1.35 |
| 1.00 | 1.73 |

Example 2

A silicon bismuthate bulk glass was prepared by intimately mixing $Bi_2O_3$ and $SiO_2$ powders in an alumina crucible to form a mixture consisting of 90 wt. % $Bi_2O_3$ and 10 wt. % $SiO_2$ (54 mol. % $Bi_2O_3$ and 46 mol. % $SiO_2$) The mixture was melted at 1000° C. and was quenched by pouring the melt onto a glass surface. The resulting silicon bismuthate bulk glass was wet-ground with n-heptane using an alumina mortar and pestle to form particles ranging from approximately 1 μm to 1 mm in size. The particles and the n-heptane were placed in a milling jar of a PM200 planetary ball mill (Retsch GmbH) loaded with yttria-stabilized zirconia beads, and oleic acid was added. The particles were ground in the ball mill for approximately 25 hours, resulting in raw nanoparticles having an average size of about 1.2 nm. A sample of the raw nanoparticles were used to prepare a liquid crystal composition containing TL205 doped with 0.08 wt. % raw nanoparticles. The composition exhibited a polarization of $17 \times 10^{-6}$ $C/cm^2$ and no measurable dipole moment.

The raw nanoparticles then were placed into a harvesting vessel, and the harvesting vessel was filled with n-heptane. The harvesting vessel contained a radial ground electrode surrounding a dielectric field tube, through which a voltage source electrode was inserted. Dielectric catch plates made of a dielectric material were attached to the outside of the dielectric field tube at three locations along the dielectric field tube. A potential of −8 kV was applied to the voltage source electrode to establish a nonuniform electric field gradient in the harvesting vessel. All of the silicon bismuthate glass nanoparticles that were ferroelectric were propelled toward the dielectric catch plates and rapidly formed a thin layer on the dielectric catch plates.

A sample of the ferroelectric nanoparticles harvested at negative applied potential of −8 kV was used to prepare a liquid crystal composition with TL205. The composition was 0.06 wt. % ferroelectric nanoparticle in the TL205. The composition had a polarization of $1.03 \times 10^{-6}$ $C/cm^2$ and a dipole moment of $6.1 \times 10^{-23}$ C·cm.

In an additional trial, the harvesting was conducted using a positive electric potential of +20 kV. The positive potential resulted in slow collection of ferroelectric nanoparticles on the dielectric catch plate. Multiple cycles were required to collect all of the nanoparticles that were ferroelectric. The ferroelectric silicon bismuthate nanoparticles were collected for further hysteresis measurements.

A sample of the ferroelectric nanoparticles harvested at positive applied potential was used to prepare a liquid crystal composition with TL205. The composition contained 0.04 wt. % ferroelectric nanoparticle in the TL205. The composition had a polarization of $3.1 \times 10^{-6}$ $C/cm^2$ and a dipole moment of $6.1 \times 10^{-23}$ C·cm. An additional measurement was made on a 0.04 wt. % composition in TL205 of the nanoparticles that failed to be harvested using the positive potential. These rejected particles had a polarization of $16 \times 10^{-6}$ $C/cm^2$ and no measurable dipole moment.

Additional samples of the ferroelectric silicon bismuthate nanoparticles were mixed in various proportions with TL205 to form liquid crystal compositions. Dielectric hysteresis curves and Freedericksz transition characteristics at 594 nm of the liquid crystal compositions were measured to ascertain Freedericksz asymmetry of the liquid crystal compositions as a function of nanoparticle concentration. The results are compiled in TABLE 3.

TABLE 3

| $Bi_2O_3/SiO_2$ Nanoparticle Concentration (wt. %) | Freedericksz Asymmetry (V) |
|---|---|
| 0 | 0.05 |
| 0.0156 | 1.39 |
| 0.0313 | 0.48 |
| 0.0625 | 1.83 |
| 0.125 | 1.35 |
| 0.250 | 0.81 |
| 0.500 | 0.73 |
| 1.00 | 0.90 |

Example 3

A gallium lead bismuthate bulk glass was prepared by intimately mixing $Bi_2O_3$, $Ga_2O_3$, and PbO powders in an alumina crucible to form a mixture consisting of 54.5 wt. % $Bi_2O_3$, 15.7 wt. % $Ga_2O_3$, and 29.8 wt. % PbO (35 mol. % $Bi_2O_3$, 25 mol. % $Ga_2O_3$, and 40 mol. % PbO). The mixture was melted at 950° C. and was quenched by pouring the melt onto a glass surface. The resulting gallium lead bismuthate bulk glass was wet-ground with n-heptane using an alumina mortar and pestle to form particles ranging from approximately 1 µm to 1 mm in size. The particles and the n-heptane were placed in a milling jar of a PM200 planetary ball mill (Retsch GmbH) loaded with yttria-stabilized zirconia beads, and oleic acid was added. The particles were ground in the ball mill for approximately 25 hours, resulting in raw nanoparticles. A sample of the raw nanoparticles were used to prepare a liquid crystal composition containing TL205 doped with 0.08 wt. % raw nanoparticles. The composition exhibited a polarization of $13 \times 10^{-6}$ $C/cm^2$ and no measurable dipole moment.

The raw nanoparticles then were placed into a harvesting vessel, and the harvesting vessel was filled with n-heptane. The harvesting vessel contained a radial ground electrode surrounding a dielectric field tube, through which a voltage source electrode was inserted. Dielectric catch plates made of a dielectric material were attached to the outside of the dielectric field tube at three locations along the dielectric field tube. A potential of −20 kV was applied to the voltage source electrode to establish a nonuniform electric field gradient in the harvesting vessel, but no harvesting occurred. At a potential of −14 kV, however, the gallium lead bismuthate glass nanoparticles that were ferroelectric were immediately propelled toward the dielectric catch plates and rapidly formed a thin layer on the dielectric catch plates.

A sample of the ferroelectric nanoparticles harvested at negative applied potential of −14 kV was used to prepare a liquid crystal composition with TL205. The composition was 0.06 wt. % ferroelectric nanoparticle in the TL205. The composition had a polarization of $1.7 \times 10^{-6}$ $C/cm^2$ and a dipole moment of $8.1 \times 10^{-23}$ C·cm.

In an additional trial, the harvesting attempted using various positive electric potentials. Regardless of the positive potential applied, no ferroelectric gallium lead bismuthate glass nanoparticles could be harvested.

Example 4

A lithium niobate tellurite bulk glass is prepared as described above from $TeO_2$ and $LiNbO_3$ powders to with a composition of about 60 wt. % to 90 wt. % $TeO_2$ and from about 10 wt. % to 40 wt. % $LiNbO_3$ (about 55 mol % to 90 mol. % $TeO_2$ and about 10 wt. % to 45 wt. % $LiNbO_3$). The bulk glass is reduced using a planetary ball mill, and ferroelectric nanoparticles are harvested as described above. A sample of the raw nanoparticles may be used to prepare a liquid crystal composition containing TL205 doped with 0.08 wt. % raw nanoparticles. The composition exhibits a polarization of $15 \times 10^{-6}$ $C/cm^2$ and no measurable dipole moment.

When harvested at a negative applied potential and added to TL205 to form a composition consisting of 0.06 wt. % lithium niobate tellurite ferroelectric nanoparticle in the TL205, the composition has a polarization of $0.9 \times 10^{-6}$ $C/cm^2$ and a dipole moment of $7.8 \times 10^{-23}$ C·cm. However, nanoparticles that fail to be harvested when the negative potential is applied have a polarization of $1.3 \times 10^{-6}$ $C/cm^2$ and a dipole moment of $12.2 \times 10^{-23}$ C·cm.

Example 5

Particles of a borosilicate bulk glass (Pyrex®, containing approximately 14 wt. % boron, 38 wt. % silicon, 1 wt. % aluminum, 0.3 wt. % sodium, less than 1 wt. % potassium, and 51 wt. % oxygen) are reduced using a planetary ball mill to an average particle size less than 20 nm and are subjected to harvesting as described above. The harvested borosilicate glass is used to prepare a liquid crystal composition containing TL205 doped with 0.5 wt. % borosilicate nanoparticles. Using pure TL205 as a basis for comparison, the borosilicate nanoparticles contribute to the liquid crystal mixture gain coefficient a gain comparable to the gain attained from a similar composition containing 0.5 wt. % $BaTiO_3$ harvested nanoparticles with an average particle size of about 9 nm. The gain contribution from the borosilicate nanoparticles has a better high spatial-frequency response, compared to the gain contribution from the $BaTiO_3$ nanoparticles.

Comparative Example 1

Particles of $TeO_2$ were subjected to planetary ball milling and harvesting, as described above for the glasses in Examples 1-3, to form raw nanoparticles. No ferroelectric $TeO_2$ nanoparticles could be harvested from the raw nanoparticles. The raw nanoparticles were measured for hysteresis, and no evidence of ferroelectricity was observed.

Comparative Example 2

Particles of PbO were subjected to planetary ball milling and harvesting, as described above for the glasses in Examples 1-3, to form raw nanoparticles. No ferroelectric PbO nanoparticles could be harvested from the raw nanoparticles. The raw nanoparticles were measured for hysteresis, and no evidence of ferroelectricity was observed.

The Comparative Examples 1 and 2 reveal that the physical size reduction of intrinsically nonferroelectric individual oxides $TeO_2$ and PbO does not universally impart ferroelectric characteristics into nanoparticles. Thus, it is believed that the transformation of intrinsically nonferroelectric bulk glasses to ferroelectric nanoparticles by the physical size reduction and harvesting is a process unique to mixed-material glasses, of which the compositions described in Examples 1-5 are illustrative.

Unless otherwise defined, all technical and scientific terms used herein have the same meaning as commonly understood by one of ordinary skill in the applicable art. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in the embodiments described herein. Notwithstanding that the numerical ranges and parameters setting forth the broad scope of the embodiments herein are approximations, the numerical values set forth in the specific examples are reported as precisely as possible. One of ordinary skill in the art will understand that any numerical values inherently contain certain errors attributable to the measurement techniques used to ascertain the values.

It is noted that terms like "preferably," "commonly," and "typically" are not utilized herein to limit the scope of any embodiment or to imply that certain features are critical, essential, or even important to structure or function. Rather, these terms are merely intended to highlight alternative or additional features that may or may not be utilized in a particular embodiment.

It is noted that the term "substantially" is used herein to represent the inherent degree of uncertainty that may be attributed to any quantitative comparison, value, measurement, or other representation. The term "substantially" is used herein also to represent the degree by which a quantitative representation may vary from a stated reference without resulting in a change in the basic function of the subject matter at issue. As such, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something slightly less than exact.

What is claimed is:

1. A method for preparing ferroelectric nanoparticles, the method comprising:
   size-reducing a starting material comprising particles of a bulk intrinsically nonferroelectric glass to form glass nanoparticles having an average size of less than 20 nm, the glass nanoparticles comprising ferroelectric nanoparticles,
   wherein:
   the starting material comprises a slurry of the bulk intrinsically nonferroelectric glass in heptane and oleic acid; and
   the size-reducing comprises grinding the starting material in a planetary ball mill to form the glass nanoparticles.

2. The method of claim 1, wherein the bulk intrinsically nonferroelectric glass is selected from the group consisting of borosilicate glasses, tellurite glasses, bismuthate glasses, gallate glasses, sulfide glasses and mixtures thereof.

3. The method of claim 1, wherein the glass nanoparticles have an average size of less than 10 nm.

4. The method of claim 1, further comprising preparing the particles of the bulk intrinsically nonferroelectric glass by:
   melting a first component and at least one second component in a melting vessel to form a molten mixture, wherein:
   the first component is selected from the group consisting of $TeO_2$, $Bi_2O_3$, $SiO_2$, $Ga_2O_3$ and $Ga_2S_3$;
   the at least one second component is selected from the group consisting of $Li_2O$, $Na_2O$, $K_2O$, $Bi_2O_3$, $Ga_2O_3$, PbO, $WO_3$, $LiNbO_3$, $Nb_2O_5$, $TiO_2$, ZnO, BaO, $SiO_2$, $Al_2O_3$, $B_2O_3$, $La_2O_3$ and $La_2S_3$, and mixtures thereof; and
   the first component is different from the at least one second component;
   quenching the molten mixture to form a vitrified solid; and
   crushing the vitrified solid to form the particles of the bulk intrinsically nonferroelectric glass.

5. The method of claim 4, further comprising harvesting the ferroelectric nanoparticles from the glass nanoparticles by:
   transferring the glass nanoparticles into a harvesting vessel, the harvesting vessel comprising at least one catch plate;
   creating a nonuniform electric field gradient within the harvesting vessel that propels the ferroelectric nanoparticles toward the at least one catch plate; and
   collecting the ferroelectric nanoparticles from the at least one catch plate.

6. The method of claim 1, further comprising harvesting the ferroelectric nanoparticles from the glass nanoparticles by:
   transferring the glass nanoparticles into a harvesting vessel, the harvesting vessel comprising at least one catch plate;
   creating a nonuniform electric field gradient within the harvesting vessel that propels the ferroelectric nanoparticles toward the at least one catch plate; and
   collecting the ferroelectric nanoparticles from the at least one catch plate.

7. The method of claim 1, wherein:
   the bulk intrinsically nonferroelectric glass is selected from the group consisting of borosilicate glasses, tellurite glasses, bismuthate glasses, and gallate glasses;
   the tellurite glasses are selected from the group consisting of lithium sodium tellurite glasses, lead tellurite glasses, tungsten tellurite glasses, lithium potassium tellurite glasses, lithium potassium tellurite glasses,-lithium niobate tellurite glasses, lithium niobium tellurite glasses, lithium titanium tellurite glasses, and lithium tungsten tellurite glasses;
   the bismuthate glasses are selected from the group consisting of lithium bismuthate glasses, lithium zinc bismuthate glasses, lithium titanium bismuthate glasses, lithium titanium zinc bismuthate glasses, silicon bismuthate glasses, titanium bismuthate glasses, and lithium barium bismuthate glasses; and
   the gallate glasses are selected from the group consisting of bismuth lead gallate glasses, bismuth lead silicon gallate glasses, bismuth tungsten gallate glasses, bismuth titanium gallate glasses, bismuth sodium gallate glasses, and bismuth lithium gallate glasses.

8. The method of claim 1, wherein the bulk intrinsically nonferroelectric glass comprises a silicon bismuthate glass.

9. The method of claim 8, wherein the silicon bismuthate glass comprises:
   from about 23 mol. % to about 54 mol. % $Bi_2O_3$ and
   from about 46 mol. % to about 77 mol. % $SiO_2$.

10. The method of claim 1, wherein the bulk intrinsically nonferroelectric glass comprises a lead tellurite glass.

11. The method of claim 10, wherein the lead tellurite glass comprises:
   from about 75 mol. % to about 85 mol. % $TeO_2$ and
   from about 15 mol. % to about 25 mol. % PbO.

12. The method of claim 1, wherein the bulk intrinsically nonferroelectric glass comprises a bismuth lead gallate glass.

13. The method of claim 12, wherein the bismuth lead gallate glass comprises:
   from about 30 mol. % to about 50 mol. % $Bi_2O_3$;
   from about 20 mol. % to about 30 mol. % $Ga_2O_3$; and
   from about 20 mol. % to about 50 mol. % PbO.

14. The method of claim 12, wherein the bismuth lead gallate glass comprises:
   about 35 mol. % $Bi_2O_3$;
   about 25 mol. % $Ga_2O_3$; and
   about 40 mol. % PbO.

15. The method of claim 1, wherein the bulk intrinsically nonferroelectric glass comprises a lithium niobate tellurite glass.

16. The method of claim 15, wherein the lithium niobate tellurite glass comprises:
   from about 55 mol. % to about 90 mol. % $TeO_2$; and
   from about 10 mol. % to about 45 mol. % $LiNbO_3$.

17. A method for preparing ferroelectric nanoparticles, the method comprising:
   preparing particles of a bulk intrinsically nonferroelectric glass by:
      melting a first component and at least one second component in a melting vessel to form a molten mixture, wherein:
         the first component is selected from the group consisting of $TeO_2$, $Bi_2O_3$, $SiO_2$, $Ga_2O_3$, and $Ga_2S_3$;
         the at least one second component is selected from the group consisting of $Li_2O$, $Na_2O$, $K_2O$, $Bi_2O_3$, $Ga_2O_3$, PbO, $WO_3$, $LiNbO_3$, $Nb_2O_5$, $TiO_2$, ZnO, BaO, $SiO_2$, $Al_2O_3$, $B_2O_3$, $La_2O_3$, and $La_2S_3$, and mixtures thereof; and
         the first component is different from the at least one second component;
      quenching the molten mixture to form a vitrified solid; and
      crushing the vitrified solid to form the particles of the bulk intrinsically nonferroelectric glass; and
   size-reducing a starting material comprising the particles of the bulk intrinsically nonferroelectric glass to form glass nanoparticles having an average size of less than 20 nm, the glass nanoparticles comprising ferroelectric nanoparticles.

18. The method of claim 17, wherein the bulk intrinsically nonferroelectric glass comprises a lead tellurite glass.

19. The method of claim 18, wherein the lead tellurite glass comprises:
   from about 75 mol. % to about 85 mol. % $TeO_2$ and
   from about 15 mol. % to about 25 mol. % PbO.

20. The method of claim 17, further comprising harvesting the ferroelectric nanoparticles from the glass nanoparticles by:
   transferring the glass nanoparticles into a harvesting vessel, the harvesting vessel comprising at least one catch plate;
   creating a nonuniform electric field gradient within the harvesting vessel that propels the ferroelectric nanoparticles toward the at least one catch plate; and
   collecting the ferroelectric nanoparticles from the at least one catch plate.

21. A method for preparing ferroelectric nanoparticles, the method comprising:
   size-reducing a starting material comprising particles of a bulk intrinsically nonferroelectric glass to form glass nanoparticles having an average size of less than 20 nm, the glass nanoparticles comprising ferroelectric nanoparticles; and
   harvesting the ferroelectric nanoparticles from the glass nanoparticles by:
      transferring the glass nanoparticles into a harvesting vessel, the harvesting vessel comprising at least one catch plate;
      creating a nonuniform electric field gradient within the harvesting vessel that propels the ferroelectric nanoparticles toward the at least one catch plate; and
      collecting the ferroelectric nanoparticles from the at least one catch plate.

22. The method of claim 21, wherein:
   the bulk intrinsically nonferroelectric glass is selected from the group consisting of borosilicate glasses, tellurite glasses, bismuthate glasses, and gallate glasses;
   the tellurite glasses are selected from the group consisting of lithium sodium tellurite glasses, lead tellurite glasses, tungsten tellurite glasses, lithium potassium tellurite glasses, lithium potassium tellurite glasses,-lithium niobate tellurite glasses, lithium niobium tellurite glasses, lithium titanium tellurite glasses, and lithium tungsten tellurite glasses;

the bismuthate glasses are selected from the group consisting of lithium bismuthate glasses, lithium zinc bismuthate glasses, lithium titanium bismuthate glasses, lithium titanium zinc bismuthate glasses, silicon bismuthate glasses, titanium bismuthate glasses, and lithium barium bismuthate glasses; and the gallate glasses are selected from the group consisting of bismuth lead gallate glasses, bismuth lead silicon gallate glasses, bismuth tungsten gallate glasses, bismuth titanium gallate glasses, bismuth sodium gallate glasses, and bismuth lithium gallate glasses.

23. The method of claim 21, wherein the bulk intrinsically nonferroelectric glass comprises a lead tellurite glass.

24. The method of claim 23, wherein the lead tellurite glass comprises:
from about 75 mol. % to about 85 mol. % $TeO_2$ and
from about 15 mol. % to about 25 mol. % PbO.

25. The method of claim 24, wherein the glass nanoparticles have an average size of less than 10 nm.

\* \* \* \* \*

UNITED STATES PATENT AND TRADEMARK OFFICE
CERTIFICATE OF CORRECTION

Page 1 of 2

PATENT NO. : 9,061,905 B2
APPLICATION NO. : 13/712433
DATED : June 23, 2015
INVENTOR(S) : Gary Cook et al.

It is certified that error appears in the above-identified patent and that said Letters Patent is hereby corrected as shown below:

In the Specification

Col. 4, Lines 2-3,
"sium tellurite glasses, lithium potassium tellurite glasses, lithium lithium niobate tellurite glasses, lithium niobium tel-" should read
--sium tellurite glasses, lithium niobate tellurite glasses, lithium niobium tel- --;

Col. 9, Line 4,
"vided in the base of the gas turbine to allows the glass nano-" should read
--vided in the base of the gas turbine to allow the glass nano- --;

Col. 10, Line 27,
"chemically synthesizes nanoparticles are universally repelled" should read
--chemically synthesized nanoparticles are universally repelled--;

Col. 11, Line 47,
"displays increases the both the brightness and contrast of the" should read
--displays increases both the brightness and contrast of the--;

Col. 16, Line 45,
"described above from $TeO_2$ and $LiNbO_3$ powders to with a" should read
--described above from $TeO_2$ and $LiNbO_3$ powders with a--;

In the Claims

Col. 19, Claim 7, Line 20,
"glasses, lithium potassium tellurite glasses,-lithium nio-" should read
--glasses, lithium nio- --; and Signed and Sealed this
Twenty-sixth Day of April, 2016

Michelle K. Lee
*Director of the United States Patent and Trademark Office*

CERTIFICATE OF CORRECTION (continued)
U.S. Pat. No. 9,061,905 B2

Col. 20, Claim 22, Line 67,
"glasses, lithium potassium tellurite glasses,-lithium nio-" should read
--glasses, lithium nio- --.